Feb. 3, 1931.  F. G. BEETEM  1,791,156
METHOD OF AND APPARATUS FOR CONTROLLING
THE CHARGE OF STORAGE BATTERIES
Filed Nov. 19, 1927
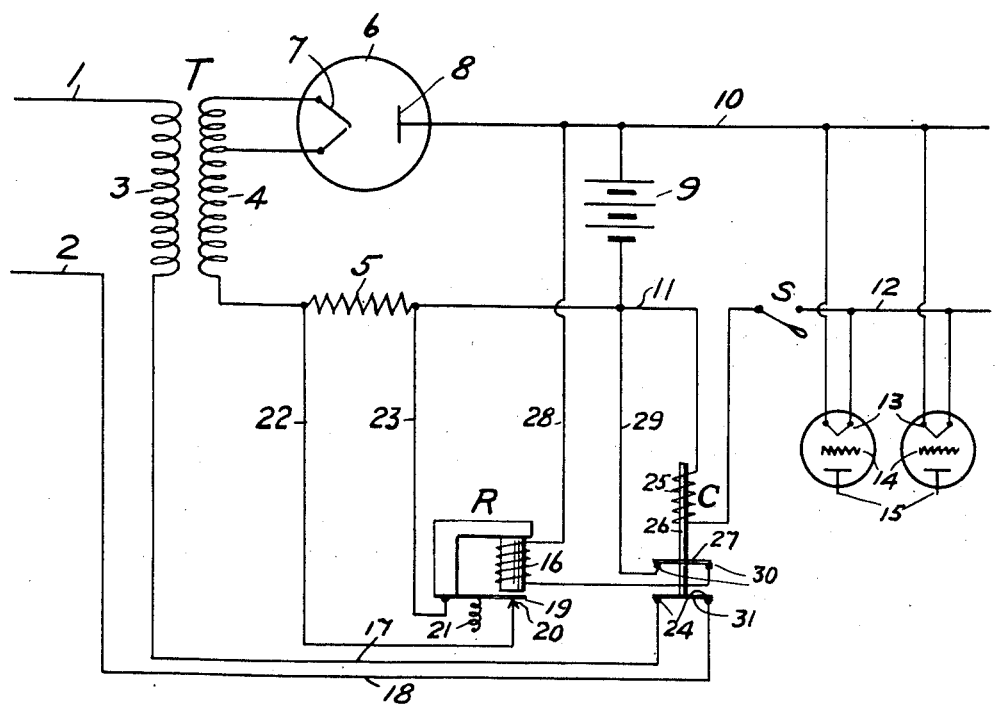
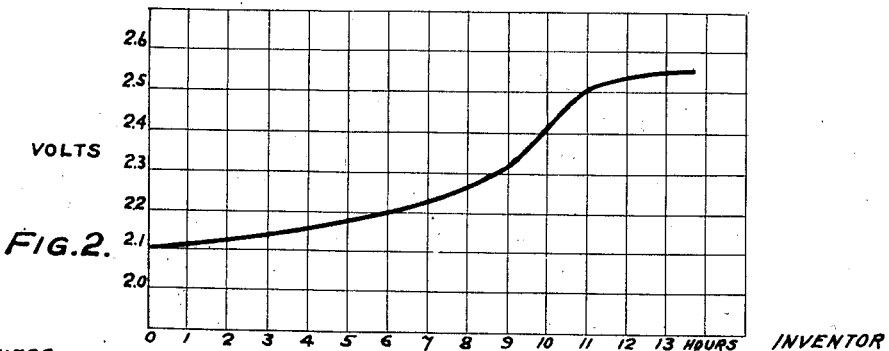

Patented Feb. 3, 1931

1,791,156

UNITED STATES PATENT OFFICE

FRANK G. BEETEM, OF PHILADELPHIA, PENNSYLVANIA

METHOD OF AND APPARATUS FOR CONTROLLING THE CHARGE OF STORAGE BATTERIES

Application filed November 19, 1927. Serial No. 234,451.

The present invention is a continuation in part of my application Serial Number 166,621 filed February 8th, 1927.

My invention relates to methods of controlling the charging of storage batteries and to apparatus for accomplishing such control, and is particularly applicable to the control of the charge of a storage battery which is subject to intermittent discharges which occur at more or less uncertain intervals and of varying amounts. One example of such method of operation is a battery employed for supplying current to the filament circuit of a radio receiving set. As another example might be mentioned a battery used for supplying an emergency lighting circuit for theatre exit light or for hospital illumination in case of the interruption of the normal supply of current.

The object of my invention is to provide for automatically recharging the battery after a discharge, so as to rapidly restore the battery in respect to the current which has beeen taken out, and then maintain the battery in a fully charged condition, ready for another similar discharge without endangering unnecessary overcharge and to accomplish this automatically without the necessity of any manual adjustment of the charging apparatus and with comparatively simple, reliable and inexpensive control devices.

My invention will be more clearly understood by referring to the following description in connection with the accompanying drawings in which Figure 1 illustrates diagrammatically one embodiment of my invention as applied to the control of a storage battery used for supplying current to the filament circuit of a radio receiving set, and Fig. 2 shows a typical characteristic charging voltage curve of a storage battery to which reference will be made in explaining the operation of the apparatus illustrated in Fig. 1.

In Fig. 1, 9 indicates a storage battery connected to the circuit 10, 11, 12, which supplies current to the filaments 13 of the electronic tubes of a radio receiving set, the grids of these tubes being shown at 14 and the plates at 15. The other circuits and apparatus of the receiving set have been omitted as they form no part of this invention.

Current for charging the storage battery is derived from the alternating current circuit 1, 2, through a suitable transformer T, whose primary winding is indicated by the numeral 3 and whose secondary winding is indicated by the numeral 4. Between the secondary winding 4 and the battery 9 is shown an electronic rectifier 6, whose filament 7 is excited by connecting it to a few turns of the secondary winding 4, and whose plate 8 is connected to one terminal of the battery 9. The other terminal of the battery 9 is connected through a resistor 5 to the corresponding terminal of the secondary winding 4.

At R is shown an electro-magnetic relay whose exciting winding 16 is connected across the terminals of the battery 9, the circuit of this winding being completed through the contacts 30 of the electromagnetic switch C via conductors 28 and 29. Armature 19 of the relay R is normally held by the spring 21 in contact with the contact point 20, thereby completing a short circuit around the resistor 5 via conductors 22 and 23. It will be noted that the apparatus thus provides for two different rates of charging current into the battery 9, the maximum rate being delivered when the resistor 5 is short circuited and the minimum rate being delivered when this resistor is included in the charging circuit upon the opening of the contact between the armature 19 and the contact point 20, this opening being the result of a suitable exciting current in the coil 16.

An electro-magnetic switch C is shown, whose actuating coil 25 is connected in the load circuit 11, 12. The magnetic core 26 of this switch carries two contact bars 27 and 31 insulated from each other. When the core 26 is in its lowest position, the contact bar 27 bridges the contact points 30 in the circuit of the coil 16 and the contact bar 31 bridges the contacts 24 which are connected by conductors 17 and 18 in circuit between the conductor 2 and the primary winding 3 of transformer T. When the coil 25 is excited by current in the load circuit, the core 26 is lifted, opening the connections across contacts 30 and 24.

A manually operated switch S is shown in the load circuit.

The operation of the apparatus described above is as follows. When the load switch S is closed, current in the load circuit passing through coil C will raise the contact bars 27 and 31. This will open the circuit of coil 16, allowing the armature 19 to drop against contact point 20, thus short circuiting the resistor 5. Contact bar 31 will also be raised, opening the connection from conductor 2 to primary winding 3 and interrupting the charging current to the storage battery 9. When the load switch S is again opened, the contact bars 27 and 31 will drop against contacts 30 and 24 respectively, thus closing the circuit of coil 16 and also supplying current to the primary winding 3 from the circuit 1, 2 via conductors 17 and 18. This will supply excitation to the transformer T and charging current will be sent through the storage battery 9 via rectifier 6.

When the charging begins, the voltage of the battery is below that at which the relay R is adjusted to operate, so that the armature 19 remains in contact with the contact point 20 and the resistor 5 is short circuited, thus providing for a comparatively high rate of charging current. As the battery charge progresses, the battery voltage will rise as illustrated in the characteristic charging curve of Fig. 2, until finally a point is reached where the voltage of the battery is sufficient to lift the armature 19 against the force of the spring 21, and open the contact between 19 and 20, thus inserting the resistor 5 in the charging circuit and reducing the charging rate.

Nothwithstanding the slight drop in battery voltage due to this reduction in the charging rate, the armature 19 will still be held out of contact with the contact point 20, since the reduction of the air gap in the magnetic circuit of the relay R caused by the upward travel of the armature will permit the armature to be held in this position with a lower voltage across the coil 16 than that necessary to start the armature from its original position.

The charging current will thereafter continue to flow at this lower rate, so long as a suitable A. C. voltage is maintained across the conductors 1, 2, until the switch S is again closed for supplying current to the load circuit. When this is done, the charging current to the battery will be interrupted by the opening of contacts 24 since the transformer T will no longer be excited; the circuit of coil 16 will also be interrupted by the opening of contacts 30 permitting the armature 19 to make contact with the contact point 20, thus providing for the higher charging rate for recharging the battery 9 whenever switch S is again opened.

An important feature of my invention is the proper adjustment of the relay R and the proper value of the resistor 5. It will be observed from the charging characteristic curve of Fig. 2 that the voltage of the battery gradually rises as the charging progresses until a point is reached where the charge is nearly completed and the voltage of the battery rises much more rapidly for a short time and then becomes more nearly horizontal, indicating the final completion of the charge. The rapid rise of voltage toward the end of charge always occurs when a substantial rate of gassing begins, and it occurs at practically the same state of charge of the battery. In accordance with my invention, the relay R is to be adjusted to operate at a voltage indicated by an intermediate point on this steep part of the voltage curve; for example, at a voltage corresponding to about 2.4 volts per cell. With such an adjustment the relay R will operate at practically the same point in the charge of the battery regardless of considerable variation in the charging rate, the amount of previous discharge or the temperature of the cells, and it is unnecessary to rely on a very accurate adjustment of the relay, since the battery voltage is rising quite rapidly and varies through a considerable range in a short time. However, the battery at this point is not fully charged, so that it is necessary to continue charging after the relay has acted. It is, however, desirable that this continuation of charge be carried on at a very low rate, so low that it can be maintained more or less indefinitely without injurious results. The resistor 5 is designed to reduce the rate to such a low value. This low charging rate should, however, be sufficient to complete the charge of the battery within a reasonable time and to keep the battery in a fully charged condition thereafter by supplying a sufficient amount of current to make up for internal losses.

It will be obvious to those skilled in the art that modification may be made in details of construction, procedure, and matters of mere form without departing from the spirit of the invention which is not limited to such matters or otherwise than the prior art and appended claims may require.

I claim:

1. In combination, a storage battery and its load circuit, a charging source for the battery, means constructed and arranged for changing the charging rate from a higher to a lower value, a coil responsive to the battery voltage and constructed and arranged to control said means, and means responsive to current in the load circuit for stopping the battery charge and simultaneously disconnecting the controlling coil.

2. In combination, a storage battery, and its load circuit, a charging source for the battery, means constructed and arranged for changing the charging rate from a higher to a lower value, a coil responsive to the battery voltage and constructed and arranged to control said means, and means responsive to current in the load circuit, said last named means constructed and arranged to stop the battery charge and disconnect the controlling coil upon the establishment of a predetermined flow of current in the load circuit and to restore the battery charge and reconnect the controlling coil upon interruption of current in the load circuit.

3. In combination, a storage battery and its load circuit, a transformer, a charging circuit connected with the secondary of the transformer and with the battery and constructed and arranged for charging the battery at a relatively high rate, means responsive to rise in battery voltage towards full charge and constructed and arranged to lower the charging rate in said circuit, a manual switch in the load circuit, and means responsive to its operation, not only for cutting the primary of the transformer out of circuit and for putting said means responsive to battery voltage out of action when the switch is closed, thereby supplyng the load circuit solely from the battery, but also for connecting the primary of the transformer into circuit when the switch is opened, thereby passing current through said charging circuit and putting said means into action.

4. In combination, a storage battery, a load circuit connected thereto, a source of alternating current for charging said storage battery, a transformer connected between said charging source and said battery, a rectifier connected between one terminal of said battery and one terminal of the secondary coil of said transformer, a resistor connected in series circuit with the secondary coil of said transformer and with said battery, a shunt circuit adapted to short circuit said resistor, a relay in said shunt circuit, a circuit including in series the coil of said shunt relay, a switch, and said storage battery, a coil responsive to the current in said load circuit and adapted to control the switch in circuit with the coil of said shunt relay, a switch in circuit with said charging source adapted to be controlled by the coil in said load circuit, and a switch in said load circuit.

5. In combination, a storage battery and its load circuit, a charging source and its circuit connection to the battery, means for adjusting the charging rate to the battery selectively at either a higher or a lower value, a relay for controlling the adjusting means, said relay having a voltage responsive exciting coil, means for connecting and disconnecting the exciting coil to and from the battery and a coil in said load circuit for controlling said last mentioned means.

FRANK G. BEETEM.